United States Patent [19]

Brammall et al.

[11] Patent Number: 4,681,355

[45] Date of Patent: Jul. 21, 1987

[54] SECURITY SEAL FOR USE WITH STRANDED CABLE

[75] Inventors: Terrence Brammall, Angola, Ind.; Richard S. Guiler, Newton, N.J.

[73] Assignee: Trans-Guard Industries, Inc., Angola, Ind.

[21] Appl. No.: 790,061

[22] Filed: Oct. 22, 1985

[51] Int. Cl.[4] .............................................. B65D 33/34

[52] U.S. Cl. .................................................... 292/323

[58] Field of Search ............ 24/136 A, 136 R, 115 G, 24/115 L, 127; 339/255 L, 273 S, 270 S, 248; 292/239, 327, 252, 307 R, DIG. 7, DIG. 10, 319, 320, 323

[56] References Cited

U.S. PATENT DOCUMENTS

| | | | |
|---|---|---|---|
| 769,878 | 9/1904 | Sturgis | 24/136 R |
| 1,518,523 | 12/1924 | Kubik | 24/136 A |
| 1,626,273 | 4/1927 | Dietze | 292/318 X |
| 3,770,307 | 11/1973 | Van Gompel | 292/307 R |
| 4,049,303 | 9/1977 | Irwin et al. | 292/307 R |

*Primary Examiner*—Richard E. Moore
*Attorney, Agent, or Firm*—Carella, Byrne, Bain & Gilfillan

[57] ABSTRACT

A seal of the type utilizing a stranded cable, in which a housing is provided with apertures for receiving the ends of a length of cable so as to form a shackle loop extending from the body. For economy of construction the housing is formed of two superimposed pieces of sheet metal suitably fastened together, said pieces being shaped to provide tapered apertures to receive a locking member and the cable. In a preferred embodiment of the invention the housing sidewalls are tapered inwardly toward the top of the housing, so that the shackle loop extending from the top can be as short as possible, to increase the resistance to tampering.

6 Claims, 3 Drawing Figures

38 28 32 36 46 30 42 34 44 40 10 22 20 24 24 26 18 25 16

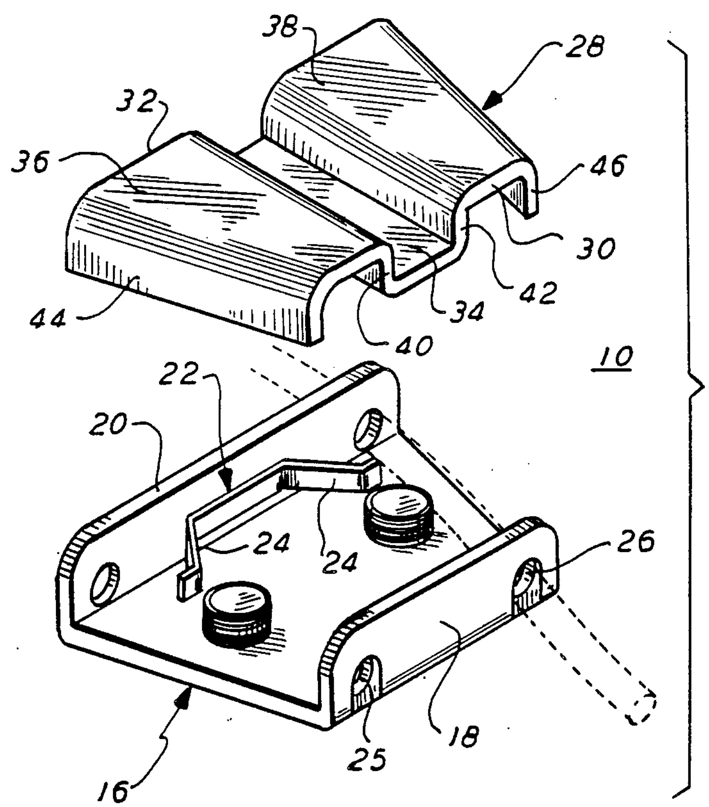
FIG. 1
FIG. 2
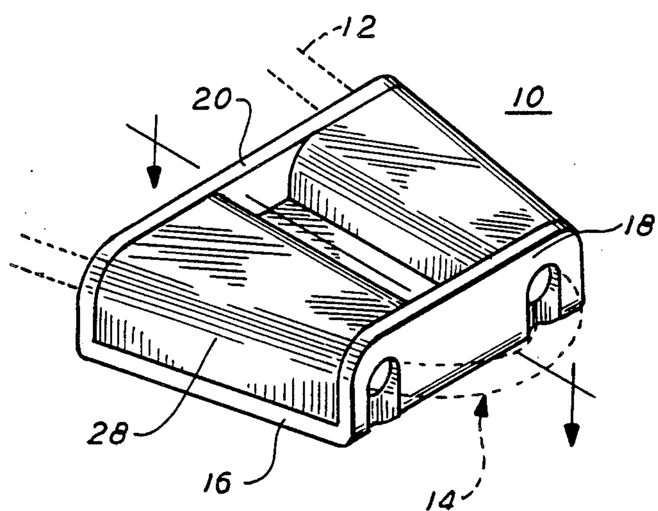
FIG. 3
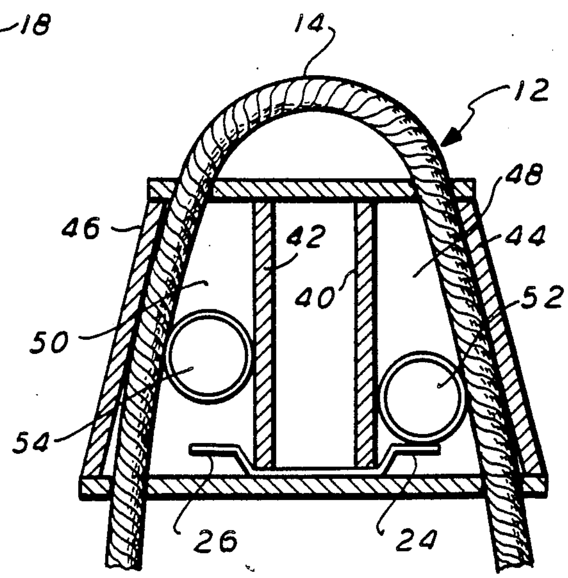

SECURITY SEAL FOR USE WITH STRANDED CABLE

BACKGROUND OF THE INVENTION

In certain types of security seals, a stranded cable is used as a shackle. A housing is provided with apertures for receiving the ends of a length of cable. One end may be permanently attached in one aperture and the other housing aperture has means allowing the cable to enter freely but locks the cable against reverse movement. One problem with such devices has been that of providing a secure and rugged housing at minimum cost. Another problem has been that of providing a housing structure that provides a minimum distance between the shackle apertures for maximum security against tampering, yet allows room for adequate internal cable locking mechanisms.

SUMMARY OF THE INVENTION

This invention provides a seal of the type utilizing a stranded cable and a housing structure for use therewith, in which the housing is formed of two superimposed pieces of sheet metal suitably fastened together, with the two pieces being formed to provide a pair of internal channels, each of which may retain a locking element for receiving an end of a cable in non-removable engagement. In a preferred embodiment of the invention the side edges of the housing, which form the outer edge of the channels, are inclined toward each other to cooperate with the locking element to provide the cable locking action, and also to position the apertures closely together at the top of the housing to allow the shackle loop extending from the apertures to be as short as possible.

BRIEF DESCRIPTION OF THE FIGURES OF THE DRAWING

FIG. 1 is an exploded view of the components of the housing of a seal embodying the features of the invention.

FIG. 2 is a perspective view of the assembled housing, with an assembled cable being shown in dashed line.

FIG. 3 is view in section of the seal housing with an assembled cable in the locked position.

DESCRIPTION OF THE ILLUSTRATED EMBODIMENT

Referring to the drawing there is illustrated a security seal housing 10 which is adapted to receive the ends of a cable 12 in locking engagement so as to form a cable loop 14 serving as a shackle.

In the illustrated embodiment the housing is formed of two superimposed pieces of relatively thick sheet metal. The lower piece 16 is generally trapezoidal in plan shape, with upturned flanges 18 and 20 at what may be considered the top and bottom respectively of the housing as will appear hereinafter. A biasing spring 22 is mounted onto the bottom flange 20, with a pair of spring legs 24 extending upwardly and outwardly from the center portion of the spring. The upper and lower flanges of the lower housing portion are provided with apertures 25 and 26 respectively to receive ends of the cable 12 so that the loop 14 is formed at the upper end of the housing, as will appear hereinafter.

The upper housing piece 28 is also generally trapezoidal in plan shape, with the dimension between upper and lower edges 30 and 32 being such that when assembled onto the lower housing piece 16, said edges can fit inside the flanges 18 and 20.

The upper housing portion 28 also has a depressed center portion 34 positioned between raised portions 36 and 38 and joined thereto by walls 40 and 42. The outside edges of the raised portions have downturned flanges 44 and 46. The distance between the flanges 44 and 46 is such that when the upper piece 28 is assembled onto the lower piece 16, said flanges overlap the side edges of the piece 16.

The upper and lower housing portions are assembled by being superimposed and fastened together by welding the center portion 34 of the upper plate to the lower plate, and welding the flanges 18, 20, 40 and 42 to the adjacent portions of the opposite plate. The superimposed plates form two internal channels 48 and 50, having inner sides formed by the walls 40 and 42 which are generally perpendicular to the top and bottom of the housing, and an outer side formed by the flanges 44 and 46. The channels are therefore wider at the bottom of the housing than at the top.

Before the two pieces are assembled, locking members 52 and 54 are placed in position on the lower body member so that after assembly a locking member is disposed in each channel. The locking members, in the illustrated embodiment, are circular discs and are held away from the bottom of the channel by the spring arms 24 and 26. The discs have a size such that the distance between the periphery of the disc and the outside wall (44 or 46) when the disc is against the spring, is less than the diameter of the cable. Therefore when a cable end is inserted into an aperture 25, the cable pushes the disc downwardly away from the upper end of the channel against the force of a sprimg arm (24 or 26) until the cable can pass between the disc and the sidewall. The disc also guides the end of the cable to the lower aperture 26.

Therefore, when an attempt is made to retract an inserted cable, the initial slight upward movement of the cable causes the disc to roll up the wall (40 or 42) toward the narrow end of the channel, compressing the cable against the outer wall (44 or 46) thereby locking the cable against further reverse movement.

In a preferred embodiment of the seal, the discs may have grooves in the outer surface which extend generally circumferentially of the disc, with said grooves being sized and spaced to mesh with the individual filiments making up one of the main strands of the cable, as shown in a copending application of Terrence N. Brammall filed Sept. 3, 1985, Ser. No. 06/772,191, and assigned to the same assignee as the present application.

In the drawing of the present application, the representation of the cable is schematic only, and is not intended to show the above mentioned structure by which the periphery of the locking disc engages the individual cable strands.

Although the seal housing may be provided with a locking element in each channel so that both ends of a cable may be inserted into the housing in locking engagement, in many applications, it is desirable to provide the seal with one end of a cable of predetermined length preassembled into non-removable engagement with the body. This may be accomplished by inserting an end of the cable into one of the channels and then deforming the surface of the body inwardly against the cable to lock it against movement. The other end of the cable is left free to be inserted by the user through a staple of a closure device on a container to be sealed, and then inserted into the other aperture of the housing. In such case, it may be desirable to provide the channel in which the cable end is staked with a locking member such as 52, to insure that a locking action will exist in case of failure of the staking.

The housing herein disclosed provides an exceptionally secure structure for locking a cable, and is economical to manufacture.

In such devices, it is desirable that the loop of the shackle, after assembly with the article to be sealed, be as small as possible, to make tampering to release the seal more difficult. In the illustrated embodiment of the invention, this is accomplished by the fact that the outer walls of the housing are tapered inwardly toward the top of the housing, so that the apertures 25 from which the cable loop extends are close enough together to provide a small shackle loop, yet far enough apart to facilitate assembly of the seal.

Since certain other changes apparent to one skilled in the art may be made in the herein described embodiments of the invention without departing from the scope thereof, it is intended that all matter contained herein be interpreted in an illustrative and not a limiting sense.

We claim:

1. A security seal of the type utilizing a stranded cable as a shackle, comprising a housing formed of two superimposed plates fastened together and being formed to provide walls forming a pair of channels between the plates, the axes of said channels being inclined toward each other so that they are closer together at the top of the housing than at the bottom, said channels increasing in width from the top of the housing to the bottom, a cable aperture in the housing at each end of each channel, and a cable locking element in at least one channel.

2. A security seal as set out in claim 1 in which the cable locking element is a disc, and means is provided in the housing to bias the disc toward the narrower end of the channel.

3. A security seal housing formed of upper and lower plates which are superimposed and fastened together, the lower plate being generally trapezoidal in plan shape and having a upturned flange at the top and bottom edges, the top edge being shorter than the bottom edge, said flanges having cable apertures near the outer ends thereof, the upper plate being generally trapezoidal in plan shape and having downturned flanges at the side edges thereof and being so dimensioned that the top and bottom edges thereof are received between the upturned flanges of the lower plate, and the downturned flanges overlap the side edge of the lower plate, said upper plate having a groove formed therein between the top and bottom edges, said groove having side walls and a bottom, the bottom being fastened to the lower plate and the side walls thereof and the downturned flanges thereof forming channels between the plates that extend between the upturned flanges of the lower plate and increase in width from the top to the bottom thereof.

4. A security seal housing formed of upper and lower plates which are superimposed and fastened together, said plates being generally trapezoidal in plan shape with top, bottom, and side edges, the top edges being shorter than the bottom edges, one plate having a groove formed therein extending between the top and bottom edges, said groove having side walls and a bottom, the bottom being fastened to the other plate, said plates having cooperating flanges at the top, bottom, and sides which close the space between the edges of the plates, the flanges at the top and bottom each having spaced apertures to receive a shackle, the side walls of the groove and the flanges at the side edges of the plate forming channels between the plates that extend between the flanges at the top and bottom and increase in width from the top to the bottom thereof.

5. A security seal of the type that utilizes a stranded cable as a shackle, said seal comprising a housing having a top and a bottom, said housing having a pair of apertures at the top of the housing and a pair of apertures at the bottom of the housing opening to a pair of internal channels for receiving the ends of a cable to enable the formation of a cable loop at the top of the housing, said internal channels being tapered so that they decrease in width from the bottom to the top, the longitudinal axis of said channels being inclined toward each other, the pair of apertures at the top of the housing being closer together than the pair of apertures at the bottom of the housing, whereby to bend the cable around a device to be sealed the cable can be assembled into the seal body without bending the cable a full 180°.

6. A seal as set out in claim 5 in which the housing is formed of a pair of superimposed plates fastened together, at least one of said plates being formed to provide, in cooperation with the other plate, said internal channels.

* * * * *